United States Patent Office 3,704,245
Patented Nov. 28, 1972

3,704,245
TRICYCLIC ENOL ETHER COMPOUNDS
Suminori Umio, 7 Midorigaoka, Aza, Yamanohara, Kawanishi-shi, Japan; Ikuo Ueda, 3–2–4 Higashikyuhoji, Yao-shi, Japan; Yoshinari Sato, 2–2–10 Midorigaoka, Ikeda-shi, Japan; and Shizuo Maeno, 3–22 Kikawanishino-cho, Higashiyodogawa-ku, Osaka-shi, Japan
No Drawing. Continuation-in-part of application Ser. No. 799,092, Feb. 13, 1969. This application Aug. 15, 1969, Ser. No. 850,660
Claims priority, application Japan, Feb. 16, 1968, 43/9,684
Int. Cl. A61k 27/00; C07d 9/00, 67/00
U.S. Cl. 260—327 B                          6 Claims

ABSTRACT OF THE DISCLOSURE

Tricyclic enol ether compounds of the general formula:

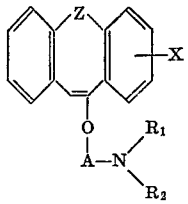

wherein X is hydrogen, halogen, lower alkyl, lower alkoxy, lower alkylthio, di(lower)alkylsulfamoyl, nitro, cyano, amino or trifluoromethyl; Z is oxy, thio or lower alkylimino; A is lower alkylene; and $R_1$ and $R_2$ are each lower alkyl or, when bound together intervening or not oxygen, nitrogen, lower alkylimino, hydroxy(lower)alkylimino, lower alkoxycarbonylimino, lower alkoxycarbonyl(lower)alkylimino, formylimino, lower alkanoyloxy(lower) alkylimino or lower alkanoylimino, the group of the formula:

represents a saturated 5 to 7-membered nitrogen-containing heterocyclic group. These compounds are useful as psychotropic and neutrotropic agents, particularly as tranquilizers.

---

This is a continuation-in-part application of Ser. No. 799,092, filed Feb. 13, 1969 and now abandoned.

The present invention relates to new tricyclic enol ether compounds having psychotropic and neurotropic activities and processes for their production.

The said tricyclic enol ether compounds are represented by the general formula:

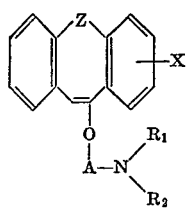

wherein X is hydrogen, halogen (e.g. chlorine, bromine, fluorine), lower alkyl (e.g. methyl, ethyl, propyl, isopropyl), lower alkoxy (e.g. methoxy, ethoxy, propoxy), lower alkylthio (e.g. methylthio, ethylthio, propylthio), di(lower)alkylsulfamoyl (e.g. dimethylsulfamoyl, diethylsulfamoyl), nitro, cyano, amino or trifluoromethyl; Z is oxy, thio or lower alkylimino (e.g. methylimino, ethylimino); A is lower alkylene (e.g. ethylene, 1-methylethylene, 2-methylethylene, trimethylene, 1-methyltrimethylene, 2-methyltrimethylene, 2-ethyltrimethylene); and $R_1$ and $R_2$ are each lower alkyl (e.g. methyl, ethyl, propyl, butyl) or, when bound together intervening or not oxygen, nitrogen or imino bearing a substituent of the symbol $R_3$, the group of the formula:

represents a saturated 5 to 7-membered heterocyclic group such as 1-pyrrolidinyl, piperidino, 1-piperazinyl, N-$R_3$-1-piperazinyl, 1-homopiperazinyl, N-$R_3$-1-homopiperazinyl or morpholino, in which $R_3$ is lower alkyl (e.g. methyl, ethyl, propyl, isopropyl), hydroxy(lower)alkyl (e.g. 2-hydroxyethyl, 2-hydroxy-n-propyl, 3-hydroxy-n-propyl, 3-hydroxy-n-butyl, 4-hydroxy-n-butyl), lower alkoxycarbonyl (e.g. methoxycarbonyl, ethoxycarbonyl, propoxycarbonyl), lower alkoxycarbonyl(lower) alkyl (e.g. ethoxycarbonylmethyl, 1-ethoxycarbonylethyl), formyl, lower alkanoyloxy(lower)alkyl (e.g. acetyloxymethyl, acetyloxyethyl) or lower alkanoyl (e.g. acetyl, propionyl).

In the above definition, the term "lower" used in connection with the alkane moiety, which may be straight or branched, is intended to mean the one having 1 to 6 carbon atoms.

Specific examples of the compounds [I] are as follows:

10-(dialkylaminoalkyl)oxydibenzo[b,f]thiepin such as 10-(2-diethylaminoethyl)oxydibenzo[b,f]thiepin, 10-(3-dimethylaminopropyl)oxydibenzo[b,f]thiepin and 10-(1-methyl-2-dimethylaminoethyl)oxydibenzo[b,f]thiepin;

10-(1-pyrrolidinylalkyl)oxydibenzo[b,f]thiepin such as 10-[2-(1-pyrrolidinyl)ethyl]oxydibenzo[b,f]thiepin;

10-(piperidinoalkyl)oxydibenzo[b,f]thiepin such as 10-(2-piperidinoethyl)oxydibenzo[b,f]thiepin and 10-(3-piperidinopropyl)oxydibenzo[b,f]thiepin;

10-(morpholinoalkyl)oxydibenzo[b,f]thiepin such as 10-(2-morpholinoethyl)oxydibenzo[b,f]thiepin;

10-(1-piperazinylalkyl)oxydibenzo[b,f]thiepin such as 10-[2-(1-piperazinyl)ethyl]oxydibenzo[b,f]thiepin and 10-[3-(1-piperazinyl)propyl]oxydibenzo[b,f]thiepin;

10-(4-alkanoyl-1-piperazinylalkyl)oxydibenzo[b,f]thiepin such as 10-[2-(4-methyl-1-piperazinyl)ethyl]oxydibenzo[b,f]thiepin and 10-[2-(4-ethyl-1-piperazinyl)ethyl]oxydibenzo[b,f]thiepin;

10-(4-hydroxyalkyl-1-piperazinylalkyl)oxydibenzo[b,f]thiepin such as 10-[2-[4-(2-hydroxyethyl)-1-piperazinyl]ethyl]oxydibenzo[b,f]thiepin, 10-[2-[4-(2-hydroxypropyl)-1-piperazinyl]ethyl]oxydibenzo[b,f]thiepin and 10-[2-[4-(3-hydroxypropyl)-1-piperazinyl]ethyl]oxydibenzo[b,f]thiepin;

10-(4-alkoxycarbonyl-1-piperazinylalkyl)oxydibenzo-[b,f]thiepin such as 10-[2-(4-ethoxycarbonyl-1-piperazinyl)ethyl]oxydibenzo[b,f]thiepin;

10-(4-alkoxycarbonylalkyl-1-piperazinylalkyl)oxydibenzo[b,f]thiepin such as 10-[2-(4-ethoxycarbonylmethyl-1-piperazinyl)ethyl]oxydibenzo[b,f]thiepin, 10-[2-[4-(1-ethoxycarbonylethyl)-1-piperazinyl]ethyl]oxydibenzo[b,f]thiepin and 10-[2-[4-methoxycarbonylmethyl-1-piperazinyl)ethyl]oxydibenzo[b,f]thiepin;

10-(4-formyl-1-piperazinyl)oxydibenzo[b,f]thiepin such as 10-[2-(4-formyl-1-piperazinyl)ethyl]oxydibenzo-[b,f]thiepin;

10-(4-alkanoyloxyalkyl-1-piperazinylalkyl)oxydibenzo-[b,f]thiepin such as 10-[2-(4-acetyloxyethyl-1-piperazinyl)ethyl]oxydibenzo[b,f]thiepin;

10-(4-alkanoyl-1-piperazinylalkyloxydibenzo[b,f]thiepin such as 10-[2-(4-acetyl-1-piperazinyl)ethyl]oxydibenzo[b,f]thiepin;

10-(1-homopiperazinylalkyl)oxydibenzo[b,f]thiepin such as 10-[2-(1-homopiperazinyl)ethyl]oxydibenzo[b,f]thiepin and 10-[3-(1-homopiperazinyl)propyl]oxydibenzo[b,f]thiepin;

10-(4-substituted-1-homopiperazinylalkyl)oxydibenzo[b,f]thiepin such as 10-[2-(4-methyl-1-homopiperazinyl)ethyl]oxydibenzo[b,f]thiepin, 10-[3-(4-methyl-1-homopiperazinyl)propyl]oxydibenzo[b,f]thiepin and 10-[2-[4-(2-hydroxyethyl)-1-homopiperazinyl]ethyl]oxydibenzo[b,f]thiepin, etc.

In the above exemplified compounds, the homopiperazinyl group may have, at the 4-position, a substituent such as lower alkyl, hydroxy(lower)alkyl, lower alkoxycarbonyl, formyl, lower alkanoyloxy(lower)alkyl or lower alkenyl.

In addition, there may be also exemplified the corresponding 7 or 8-halo, lower alkyl, lower alkoxy, lower alkylthio, di(lower)alkylsulfamoyl, nitro, cyano, amino or trifluoromethyl derivatives. There may be further exemplified the corresponding dibenzo[b,f]oxepin and 5-lower alkyl-5H-dibenzo[b,f]azepine derivatives.

It has been found that the compounds [I] and their pharmaceutically acceptable salts (i.e. acid addition salts and quaternary ammonium salts) commonly and characteristically possess psychotropic and neutrotropic actions such as tranquilizing action, antiemetic action and spasmolytic action, showing activity of sleeping time prolongation, apomorphine antagonism activity, inhibitory activity of conditioned avoidance response, methamphetamine antagonism activity, catalepsy and ptosis inducing activity, adrenaline antagonism activity and histamine antagonism activity, of which the tranquilizing action is particularly notable.

Accordingly, a basic object of the present invention is to embody the compounds [I] and their salts. Another object of this invention is to embody the compounds [I] and their salts having psychotropic and neurotropic activities. A further object of the invention is to embody the compounds [I] and their salts useful as psychotropic and neurotropic agents such as tranquilizers. A still further object of the invention is to embody a process for preparing the compounds [I] and their salts. These and other objects will be apparent to those conversant with the art to which the present invention pertains from the subsequent descriptions.

According to the present invention, the compounds of the general Formula I may be prepared by various procedures.

A fundamental procedure is represented by the following scheme:

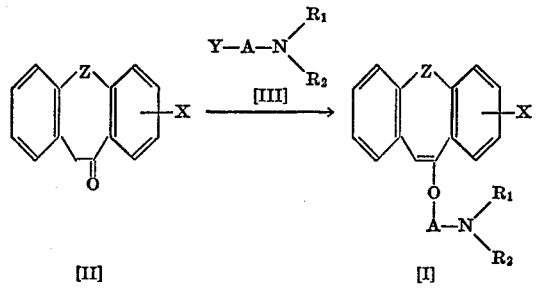

wherein Z, X, A, $R_1$ and $R_2$ are each as defined above and Y is an acid residue such as halogen (e.g. chlorine, bromine, iodine), sulfuric acid residue or sulfonic acid residue (e.g. methanesulfonyloxy, toluenesulfonyloxy, benzenesulfonyloxy).

The starting compound [II] may be produced by a conventional method [e.g. Chemical Abstracts, 62, 16215–16216 (1965); ibid., 63, 2952 (1966); J. Pharm. Soc. Japan, 74, 426 (1954)] or any analogous method thereto.

Examples of the reactive ester of aminoalcohol [III] are as follows:

dialkylaminoalkyl chloride (e.g. 2-diethylaminoethyl chloride,
2-methylethylaminoethyl chloride,
2-dimethylaminopropyl chloride,
3-dimethylaminopropyl chloride,
3-dimethylaminobutyl chloride,
3-diethylamino-2-methylpropyl chloride,
2-dipropylaminoethyl chloride,
2-ethylisopropylaminoethyl chloride,
1-chloroalkylpyrrolidine (e.g. 1-(2-chloroethyl)pyrrolidine,
1-(2-chloropropyl)pyrrolidine),
1-chloroalkylmorpholine (e.g. 1-(2-chloroethyl)morpholine),
1-chloroalkyl-4-alkylpiperazine (e.g. 1-(2-chloroethyl)-4-methylpiperazine,
1-(2-chloropropyl)-4-ethylpiperazine),
1-chloroalkyl-4-alkoxycarbonylpiperazine (e.g. 1-(2-chloroethyl)-4-ethoxycarbonylpiperazine,
1-(3-chloropropyl)-4-methoxycarbonylpiperazine),
1-chloroalkyl-4-formylpiperazine (e.g. 1-(2-chloroethyl)-4-formylpiperazine),
1-chloroalkyl-4-alkanoyloxyalkylpiperazine (e.g. 1-(2-chloroethyl)-4-acetyloxyethylpiperazine),
1-chloroalkyl-4-alkenylpiperazine (e.g. 1-(2-chloroethyl)-4-acetylpiperazine,
1-(2-chloropropyl)-4-propionylpiperazine),
1-chloroalkylhomopiperazine (e.g. 1-(2-chloroethyl)homopiperazine),
1-chloroalkyl-4-alkoxycarbonylalkyl-piperazine (e.g. 1-(2-chloroethyl)-4-ethoxycarbonylmethylpiperazine,
1-(2-chloroethyl)-4-(1-ethoxycarbonylethyl)piperazine,
1-(3-chloropropyl)-4-methoxycarbonylmethylpiperazine), and the corresponding 1-chloroalkyl-4-substituted homopiperazine (e.g. 1-(2-chloroethyl)-4-methyl-homopiperazine). And, there are also exemplified the corresponding bromide, iodide, sulfate and sulfonate.

The reaction is carried out by treating the compound [II] with the reactive ester of aminoalcohol [III] in a polar solvent (e.g. dimethylformamide, dimethylacetamide) in a basic condensing agent such as alkali metal hydride (e.g. sodium hydride, potassium hydride) or alkali metal amide (e.g. sodium amide, potassium amide, lithium amide). The most suitable basic condensing agent is alkali metal hydride. The reaction temperature is varied with the kind of the reagent. Generally, the reaction is executed under warming or heating around the boiling point of the solvent to be used.

Another fundamental procedure is shown in the following scheme:

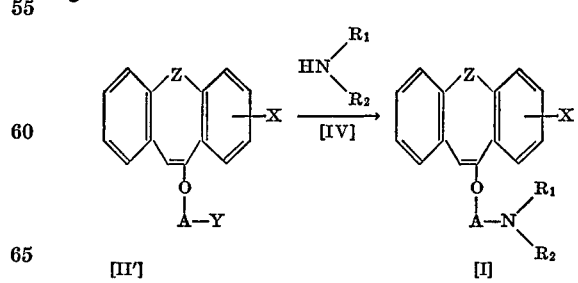

wherein Z, X, A, $R_1$, $R_2$ and Y are each as defined above.

The starting compound [II'] can be prepared by treating the compound [II] with the compound of the formula: Y—A—Y' wherein A and Y are each as defined above and Y' is an acid residue such as halogen (e.g. chlorine, bromine, iodine), sulfuric acid residue or sulfonic acid residue (e.g. methanesulfonyloxy, toluenesulfonyloxy, benzenesulfonyloxy) but more reactive than Y in the presence of a basic condensing agent (e.g. sodium hydride) in a polar solvent (e.g. dimethylformamide). For example, 10-(3-chloropropyl)oxydibenzo[b,f]thiepin, one of the starting compounds [II'], can be prepared by reacting dibenzo[b,f]thiepin-10(11H)-one with trimethylenebromochloride in the presence of sodium hydride in a mixture of benzene and dimethylformamide.

Examples of the amine [IV] include dialkylamine (e.g. dimethylamine, diethylamine, methylethylamine, dipropylamine, ethylpropylamine), pyrrolidine, piperidine, morpholine, piperazine, 1-alkylpiperazine (e.g. 1-methylpiperazine, 1-ethylpiperazine, 1-propylpiperazine), 1-hydroxylalkylpiperazine (e.g. 1-(2-hydroxyethyl)piperazine, 1 - (2-hydroxypropyl)piperazine, 1-(3-hydroxypropyl)piperazine, 1-(3-hydroxybutyl)piperazine, 1-(4-hydroxybutyl)piperazine), 1-alkoxycarbonylpiperazine (e.g. 1-methoxycarbonylpiperazine, 1-ethoxycarbonylpiperazine), 1-alkoxycarbonylalkylpiperazine (e.g. 1-ethoxycarbonylmethylpiperazine, 1 - (1-ethoxycarbonylethyl)piperazine, 1 - methoxycarbonylmethylpiperazine), 1-formylpiperazine, 1-alkanoyloxyalkylpiperazine (e.g. 1-acetyloxyethylpiperazine, 1-propionyloxypropylpiperazine), 1-alkanoylpiperazine (e.g. 1-acetylpiperazine), homopiperazine, 1-alkylhomopiperazine (e.g. 1-methylhomopiperazine, 1-ethylhomopiperazine), 1 - hydroxyalkylhomopiperazine (e.g. 1 - hydroxymethylhomopiperazine, 1-(2-hydroxyethyl)homopiperazine, 1-(3 - hydroxypropyl)homopiperazine, etc.

The reaction is conducted by treating the compound [II'] with the amine [IV] in the presence of a basic condensing agent such as alkali metal hydroxide (e.g. sodium hydroxide, potassium hydroxide), alkali metal carbonate (e.g. sodium carbonate, potassium carbonate), alkali metal bicarbonate (e.g. sodium bicarbonate, potassium bicarbonate), alkaline earth metal carbonate (e.g. calcium carbonate) or an organic tertiary amine (e.g. pyridine, triethylamine, picoline, lutidine), preferably in an inert solvent (e.g. methanol, ethanol, ether, benzene, acetone, dimethylformamide, dimethylsulfoxide). The organic tertiary amine also may be served itself as a solvent. The reaction temperature depends on the starting compound [II'], the basic condensing agent and the solvent practically used, and the reaction is usually effected around the boiling point of the solvent.

The application of the said fundamental procedure may be not suitable for preparation of some compounds of the Formula I, because of any reason such as production in poor yield, production of by-product, difficult availability of the starting compound or expensiveness of the reagent. In such case, there may be adopted any alternative procedure.

One of the alternative procedures is shown in the following scheme:

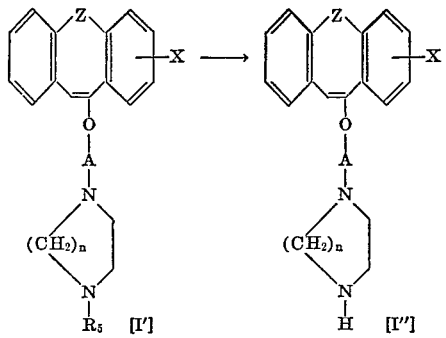

wherein Z, X and A are each as defined above, n is 2 or 3 and R₅ is formyl or lower alkoxycarbonyl (e.g. methoxycarbonyl, ethoxycarbonyl, propoxycarbonyl).

The reaction is conducted by heating the compound [I'] in an alcoholic solvent such as aqueous alcohol (e.g. methanol, ethanol) or ethylene glycol in the presence of a basic material such as alkali hydroxide (e.g. sodium hydroxide, potassium hydroxide). The reaction is usually effected under heating around the boiling point of the solvent.

Another alternative procedure is shown in the following scheme:

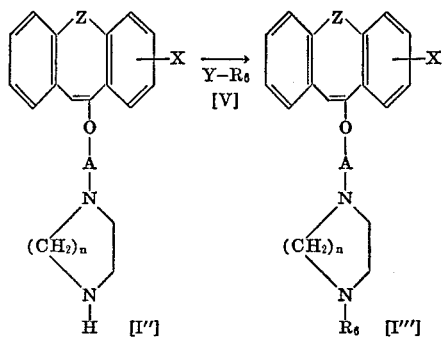

wherein Z, X, A, Y and $n$ are each as defined above and R₆ is lower alkyl (e.g. methyl, ethyl, propyl, butyl), hydroxy(lower)alkyl (e.g. 2-hydroxyethyl, 2-hydroxy-n-propyl, 3-hydroxy-n-propyl, 3-hydroxy-n-butyl, 4-hydroxy-n-butyl), lower alkoxycarbonyl (e.g. methoxycarbonyl, ethoxycarbonyl, propoxycarbonyl), lower alkoxycarbonyl(lower)alkyl (e.g. methoxycarbonylmethyl, ethoxycarbonylmethyl, 1-ethoxycarbonylethyl), lower alkanoyloxy(lower)alkyl (e.g. acetyloxyethyl) or lower alkanoyl (e.g. acetyl, propionyl).

The reaction is conducted by treating the compound [I''] with the reagent [V] in the presence of a basic condensing agent such as alkali metal (e.g. sodium, potassium, lithium) or alkaline earth metal (e.g. calcium), their hydroxide (e.g. sodium hydroxide, potassium hydroxide), amide (e.g. sodium amide), alkoxide (e.g. sodium ethoxide), carbonate (e.g. sodium carbonate, potassium carbonate) or bicarbonate (e.g. sodium bicarbonate, potassium bicarbonate) or an organic tertiary amine (e.g. pyridine, triethylamine, picoline, lutidine), preferably in a solvent (e.g. methanol, ethanol, ether, benzene, acetone, dimethylformamide, dimethylsulfoxide). The reaction temperature depends on the starting compound [II'], the basic condensing agent and the solvent practically used, and the reaction is usually effected around the boiling point of the solvent.

Another alternative procedure is shown in the following scheme:

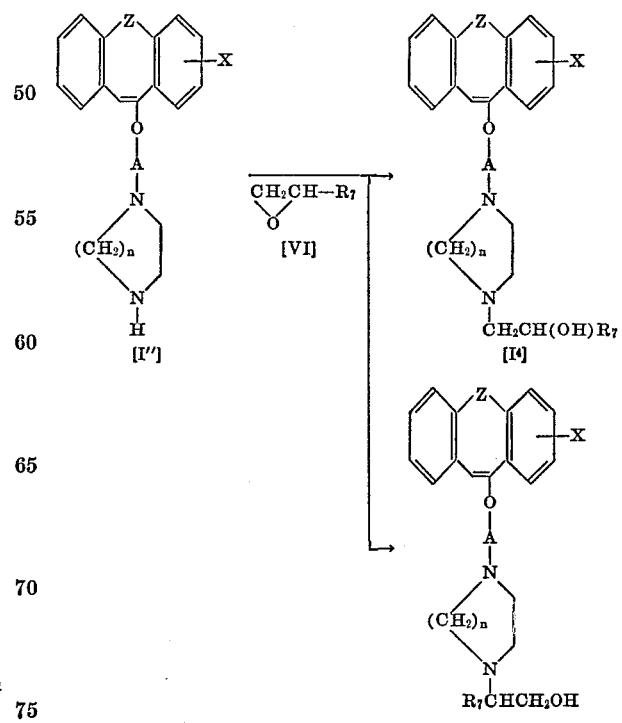

wherein Z, X, A and n are each as defined above and $R_7$ is hydrogen or lower alkyl (e.g. methyl, ethyl, propyl).

The reaction is carried out by treating the compound [I″] with the reagent [VI], usually in a solvent (e.g. methanol, ethanol, acetone, chloroform, dioxane, n-hexane, benzene, toluene, xylene). The reaction product is the compound [$I^4$] contaminated with the compound [$I^5$] and readily separated into each component by a conventional separation procedure.

A further alternative procedure is shown in the following scheme:

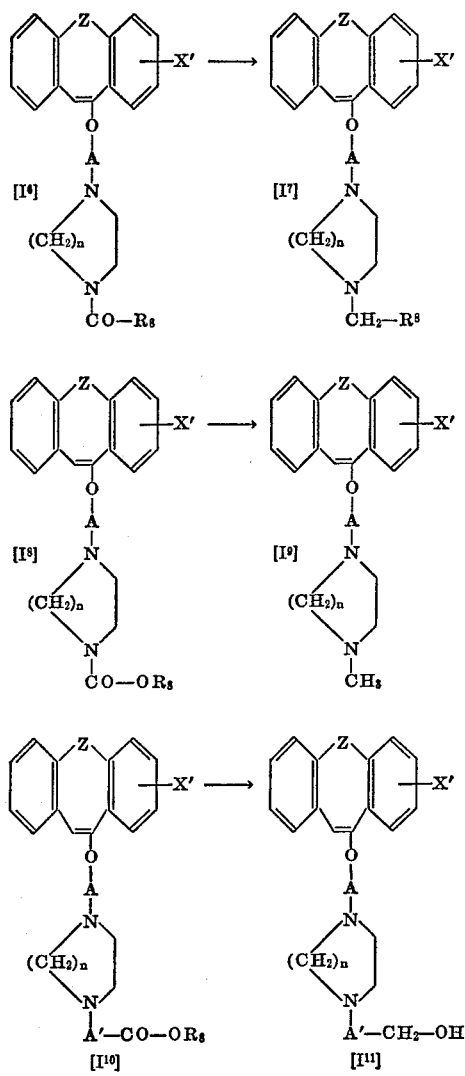

A still further alternative procedure is shown in the following scheme:

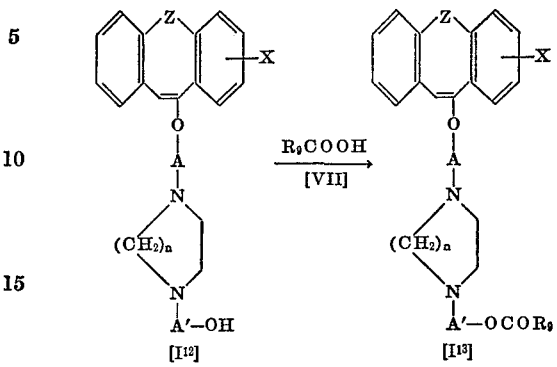

wherein Z, X, A, A′ and n are each as defined above and $R_9$ is lower alkyl (e.g. methyl, ethyl, propyl, isopropyl, butyl).

The reaction is effected by acylating the compound [$I^{12}$] with the reagent [VII] or its reactive derivative at the carboxylic group in a solvent (e.g. ether, acetone, dioxane, acetonitrile, chloroform, ethylene chloride, tetrahydrofuran, ethyl acetate, pyridine), if needed, in the presence of a basic material such as alkali hydroxide (e.g. sodium hydroxide, potassium hydroxide), alkali carbonate (e.g. sodium carbonate, potassium carbonate), alkali bicarbonate (e.g. sodium bicarbonate, potassium bicarbonate), trialkylamine (e.g. triethylamine, tripropylamine) or pyridine base (e.g. pyridine, picoline, lutidine). Examples of the reactive derivative of the reagent [VII] are acid halide, acid anhydride, amide ester, etc.

When desired, the thus prepared compound [I] may be converted into its pharmaceutically acceptable salt such as acid addition salt and quaternary ammonium salt by a conventional method. Examples of the salt are mineral acid addition salt (e.g. hydrochloride, sulfate, nitrate, phosphate), organic acid addition salt (e.g. acetate, propionate, succinate, oxalate, maleate, tartarate, fumarate, citrate, picrate) and quaternary ammonium salt with lower alkyl halide (e.g. methochloride, methobromide, methiodide, ethochloride, ethobromide, ethiodide).

As stated above, the compounds [I] and their salts show psychotropic and neurotropic activities such as activity of sleeping time prolongation, apomorphine antagonism activity, inhibitory activity of conditioned avoidance response, methamphetamine antagonism activity, catalepsy and ptosis inducing activity, adrenaline antagonism activity, histamine antagonism activity and acetylcholine antagonism activity. Some of the results on the representative compounds of this invention, i.e. 8-chloro-10-(2-dimethylaminoethyl)oxydibenzo[b,f]thiepin and 8-chloro - 10 - (2-dimethylaminoethyl)oxydibenzo[b,f]oxepin, from which the said activities are evidenced, are shown below.

Test methods (1) Sleeping time prolongation: Groups of ICR-JCL strain male mice, each group consisting of 12 animals, received the test compound by subcutaneous route. Thirty minutes thereafter, each animal was given intraperitoneally 90 mg./kg. of methylhexabital sodium. The duration of sleep was measured, and the $ED_{50}$ value was calculated by the Litchfeld-Wilcoxon method taking as 100 percent the three time prolongation compared with the control.

(2) Apomorphine antagonism test in rats: Groups of SD-JCL strain male rats, each group consisting of 10 animals, received the test compound by subcutaneous route. Thirty minutes thereafter, each animal was given intravenously 1.25 mg./kg. of apomorphine hydrochloride. After 10, 20 and 30 minutes, the animals were obwherein Z, A and n are each as defined above, X′ is hydrogen, halogen (e.g. chlorine, bromine, iodine), lower alkyl (e.g. methyl, ethyl, propyl), lower alkoxy (e.g. methoxy, ethoxy, propoxy), alkylthio (e.g. methylthio, ethylthio, propylthio) or trifluoromethyl, A′ is lower alkylene (e.g. methylene, ethylene, propylene, trimethylene) and $R_8$ is lower alkyl (e.g. methyl, ethyl, propyl, isopropyl, butyl).

The reaction is executed by treating the compound [$I^6$], [$I^8$] or [$I^{10}$] with a reducing agent such as alkali metal aluminum hydride (e.g. lithium aluminum hydride, sodium aluminum hydride, potassium aluminum hydride) in a solvent (e.g. tetrahydrofuran, ether, dioxane), usually at room temperature or around the boiling point of the solvent.

served for about several minutes. Absence of the typical gnawing movements after the injection of apomorphine was interpreted as the effect of the test compound (positive effect). The $ED_{50}$ value was calculated from the mean positive percent at each dose level by the Litchfeld-Wilcoxon method.

(3) Inhibition of conditioned avoidance response: As the test animals, there were used SD-JCL strain male rats conditioned so as to produce more than 90% response. The rats were administered the test compound by oral route and received white noise as conditioned stimulus and electroshock as unconditioned stimulus. The conditioned avoidance response at interval 30 minutes after the administration was observed and compared with the control carried out on the same animals at the preceding day to calculate the depression rate, from which the $ED_{50}$ value was determined by graphing the mean depression rate at each dose level.

(4) Methamphetamine antagonism: Groups of ICR-JCL strain male mice, each group consisting of 10 animals, received the test compound by subcutaneous route. Thirty minutes thereafter, each animal was given intraperitoneally 80 mg./kg. of methamphetamine. Each group of animals was placed together in a box (about 20 cm. long, 15 cm. wide and 12 cm. deep). The mice were observed a few times during the day and the dead ones were removed. The final count of dead mice was made after 24 hours. The $ED_{50}$ value was calculated from the mean decreasing percent of the dead animal at each dose level of the test compound.

(5) Catalepsy and ptosis test: Groups of SD-JCL strain male rats, each group consisting of 10 animals, received orally the test compound.

(a) Catalepsy.—Catalepsy in each animal at 0.5, 1, 2, 4, 6, 24 and 48 hours after the administration was observed using the following score system:

(1) The animal can be placed with its one foreleg on a 3 cm. high plate and the other foreleg remain in normal position—score 0.5.

(2) The animal can be placed sitting on its hind legs with one foreleg on a 9 cm. high platform and the other foreleg freely hanging without support—score 1.

The percent of total score in each group was calculated taking as 100 percent the highest possible score (maximal catalepsy) per group (30).

(b) Ptosis.—The following score system was used for expressing the degree of palpebral ptosis in handled rats: score 0, eyes completely closed; score 2, half open eyes; score 4, wide open eyes; score 1 and 3, intermediate values.

The percent ptosis was calculated using the following formula:

$$\frac{A-B}{A} \times 100$$

A: total score of control group
B: total score of tested group

The $ED_{50}$ value was calculated from the percent at each dose level by the Litchfeld-Wilcoxon method.

(6) Adrenaline antagonism: Femoral arterial blood pressure was measured in dogs anesthetized with pentobarbital sodium. The test compound was administered into femoral vein, and the antagonistic effect of the compound was observed on the hypertensive action produced by adrenaline.

(7) Acetylcholine and histamine antagonism: Using the guinea-pig ileum in the usual Magnus method, the antispasmodic activity of the test compound was examined. Acetylcoholine chloride (0.2 μg./ml.) and histamine phosphate (0.1 μg./ml.) were employed as the spasmogens. The $ED_{50}$ value was determined by graphing the mean depression rate at each dose level.

Results

The results are shown in the following table:

TABLE

| Experiments | 8-chloro-10-(2-dimethyl-aminoethyl)-oxydibenzo[b,f]-thiepin | 8-chloro-10-(2-dimethyl-aminoethyl)-oxydibenzo[b,f]-oxepin |
| --- | --- | --- |
| Sleeping time prolongation ($ED_{50}$) mg./kg | 2.1 | 10.6 |
| Apomorphine antagonism ($ED_{50}$) mg./kg | 12.2 | 6.6 |
| Inhibition of conditioned avoidance response ($ED_{50}$) mg./kg | 3.9 | 6.0 |
| Methamphetamine antagonism ($ED_{50}$) mg./kg | 2.3 | |
| Catalepsy test ($ED_{50}$) mg./kg | 66 | |
| Ptosis test ($ED_{50}$) mg./kg | 100 | |
| Adrenaline antagonism ($ED_{50}$) mg./kg | 0.2 | |
| Histamine antagonism ($ED_{50}$) g./ml | $7.5 \times 10^{-8}$ | $2.3 \times 10^{-7}$ |
| Ach antagonism ($ED_{50}$) g./ml | $4.8 \times 10^{-6}$ | $1.0 \times 10^{-7}$ |
| Acute toxicity (MLD) mg./kg | 500 | |

Because of the possession of the said activities, the compounds [I] and their non-toxic salts are useful as tranquilizers.

The compounds [I] and their non-toxic salts can be administered by the conventional methods, the conventional types of unit dosages or with the conventional pharamaceutical carriers to produce a tranquilizing effect in human beings.

Thus, they can be used in the form of pharmaceutical preparations, which contain them in admixture with a pharmaceutical organic or inorganic carrier material suitable for enteral or parenteral applications. Oral administration by the use of tablets, capsules or in liquid form such as suspensions, solutions or emulsions is particularly advantageous. When formed into tablets, the conventional binding and disintegrating agents used in therepeutic unit dosages can be employed. Illustrative of binding agents there can be mentioned glucose, lactose, gum acacia, gelatin manitol, starch paste, magnesium trisilicate and talc. Illustrative of disintegrating agents there can be mentioned corn starch, keratin, colloidal silica and potato starch. When administered as liquids the conventional liquid carriers can be used.

The dosage or therapeutically effective quantity of the compounds [I] and their non-toxic salts for human beings can vary over wide limits such as that of about 30 milligrams to about 1000 milligrams/day for adult. The upper limit is limited only by the degree of effect desired and economic considerations. For oral administration it is to employ from about 10 milligrams to about 300 milligrams of the therapeutic agent per unit dosage. Of course, the dosage of the particular therapeutic agent used can vary considerably, such as the age of the patient and the degree of therapeutic effect desired. Each unit dosage form of the novel therapeutic compounds can contain from about 5% to about 95% of the novel therapeutic agents weight of the entire composition with the remainder comprising conventional pharmaceutical carriers. By the term pharmaceutical carrier it is intended to include non-therapeutic materials which are conventionally used with unit dosage and includes fillers, diluents, binders, lubricants, disintegrating agents and solvents. Of course, it is possible to administer the novel thereapeutics, i.e. the pure compounds, without the use of a pharmaeutical carrier.

Practical and presently-preferred embodiments of this invention are illustratively shown in the following examples.

EXAMPLE 1

(A) A suspension of 1.5 g. of sodium hydride in toluene (5 ml.) was added dropwise to 4.4 g. of dibenzo [b,f]-thiepin-10(11H)-one dissolved in a mixture of benzene (26 ml.) and dimethylformamide (8 ml.). This was heated at 100° C. for 3 hours, cooled to 50° C. and thereto was added diethylaminoethyl chloride (4.4 g.), and then the resulting mixture was heated at 50° C. for 6 minutes and at 100 C. for 17 hours. The reaction mixture, after cooled, was added to a saturated aqueous solution of ammonium chloride, and the solution was extracted with ether. The ether layer, after washed with water, was extracted with 10% hydrochloric acid solution. The aqueous layer was extracted with ether. The ether extract, after washed with water, was made neutral with concentrated sodium hydroxide solution and extracted with chloroform. The chloroform layer was washed with water, dried over magnesium sulfate and concentrated to provide 5.1 g. 10-(2 - diethylamino)ethyloxydibenzo[b,f]thiepin as oil, which was converted with maleic acid, into the maleate of 10-(2-diethylaminoethyl)oxydibenzo[b,f]thiepin as crystals, M.P. 129–130° C.

(B) A suspension of 1.5 g. sodium hydride in toluenet (3 ml.) was added dropwise to 4.4 g. of dibenzo[b,f]thiepin-10(11H)-one dissolved in a mixture of benzene (26 ml.) and dimethylformamide (8 ml.). The mixture, after heated at 80° C. for 2 hours and cooled to 50° C., was added with 4.4 g. of 3-dimethylaminopropyl chloride. The resulting mixture was treated as in (A) to provide 5.2 g. of 10-(3-dimethylaminopropyl)oxydibenzo[b,f] thiepin as oil. Maleate, M.P. 140–141° C. (decomp.)

(C) A suspension of 30 g. of sodium hydride in benzene (30 ml.) was added dropwise to 52 g. of 8-chlorodibenzo[b,f]thiepin-10(11H)-one dissolved in dimethylformamide (800 ml.), and the mixture was heated at 100° C. for 2 hours. To this, there were added 68 g. of 2-dimethylaminoethyl chloride, and the mixture was heated at 60° C. for 39 hours. The reaction mixture, after cooled, was poured into ice-water, and the solution was extracted with ethyl acetate. The ethyl acetate layer, after washed with water, was extracted with 10% hydrochloric acid, when oil was precipitated. The aqueous layer, in which oil was precipitated, was washed with ether, made neutral with concentrated sodium hydroxide solution and then extracted with ethyl acetate. The ethyl acetate layer was washed with water, dried over magnesium sulfate, and concentrated to give oil, which was allowed to stand to provide solid. The solid was washed with petroleum ether and recrystallized from cyclohexane to yield 42.5 g. of 8-chloro-10-(2-dimethylaminoethyl)-oxydibenzo[b,f]thiepin as crystals, M.P. 90–91° C. Maleate as colorless needle, M.P. 204–204.5° C.

(D) A solution of 10.8 g. of sodium hydride in benzene (30 ml.) was added dropwise to 12.5 g. of 8-chloro-dibenzo[b,f]oxepin-10(11H)-one dissolved in a mixture of benzene (78 ml.) and dimethylformamide (30 ml.). The resulting mixture was heated at 80–90° C. for two hours, cooled and then added with 10.8 g. of 2-dimethylaminoethyl chloride. The mixture was heated at 50° C. for 17 hours, poured in ice-water and extracted with ether. The ether layer, after washed with water, was extracted with 10% hydrochloric acid. The aqueous layer, after made neutral with concentrated sodium hydroxide solution, was extracted with chloroform. The chloroform layer was dried over magnesium sulfate, passed through column chromatograph filled with alumina and then eluted with ethyl acetate. The first eluted fraction was concentrated to provide 11.9 g. of 8-chloro-10-(2-dimethylaminoethyl) oxydibenzo[b,f]oxepin as oil. This was converted into the maleate, which was recrystallized from ethanol and then acetone to give crystals, M.P. 161–163.5° C. (decomp.).

(E) A solution of 2.0 g. of sodium hydride in benzene (4 ml.) was added dropwise to 2.1 g. of 8-chlorodibenzo[b,f]oxepin-10(11H)-one in dimethylformamide (8 ml.) and benzene (26 ml.). The mixture, after heated at 80–90° C. for 2 hours and cooled, was added with 2.1 g. of 3-dimethylaminopropyl chloride. The resulting mixture was treated as in (D) to provide 2.7 g. of 8-chloro-10-(3-dimethylaminopropyl)oxydibenzo[b,f]oxepin as oil. This was converted into the maleate, which was recrystallized to provide crystals, M.P. 153–153.5° C. (decomp.).

(F) A solution of 1.2 g. of 8-methoxydibenzo[b,f]oxepin-10(11H)-one in dimethylformamide (20 ml.) was treated with 2.2 g. of 2-dimethylaminoethyl chloride as in (D) to yield 0.35 g. of 8-methoxy-10-(2-dimethylaminoethyl)-oxydibenzo[b,f]-oxepin as red oil. This was converted into the maleate, which was recrystallized from ethanol to give 0.3 g. of colorless crystals, M.P. 166–167.5° C.

(G) A solution of 3.8 g. of 8-chlorodibenzo[b,f]-thiepin-10(11H)-one in dimethylformamide (76 ml.) was treated with 7.0 g. of 1-(2-chloroethyl)-4-ethoxycarbonyl-piperazine as in (D) to yield 3.4 g. of 8-chloro-10-[2-(4-ethoxycarbonyl - 1 - piperazinyl)ethyl]oxydibenzo[b,f]-thiepin as yellow oil.

I.R. (liquid film)

Carbonyl:
  1740 cm.$^{-1(s)}$
  1700
Enol ether, 1620 cm.$^{-1}$

N.M.R. (CCl$_4$):

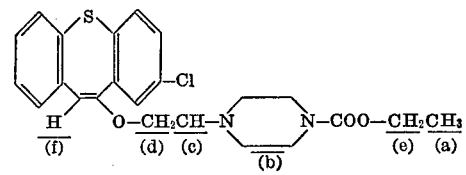

| | P.p.m. |
|---|---|
| (a): | |
| (Triplet) 3 H | 1.32 |
| (b): | |
| (Triplet) 8 H | {2.50<br>{2.95 |
| (c): | |
| (Triplet) 2 H | 2.80 |
| (d): | |
| (Triplet) 4 H | near 4.00 |
| (e): | |
| (Quartet) 4 H | near 4.00 |
| (f): | |
| (Singlet) 1 H | 6.29 |
| (g): | |
| (Multiplet) Benzene ring portion | 7.00–7.6 |

(H) A solution of 1.5 g. of 8-methoxydibenzo[b,f]-thiepin-10(11H)-one in dimethylformamide (15 ml.) was treated with 2.5 g. of 1-methyl-2-dimethylaminoethyl chloride as in (D) to yield 0.55 g. of d,1-8-methoxy-10-(1-methyl-2-dimethylaminoethyl)oxydibenzo[b,f]thiepin as yellow oil.

I.R. (liquid film):

Enol ether, 1620, 1595 cm.$^{-1}$

N.M.R. (CCl$_4$, tetramethylsilan)

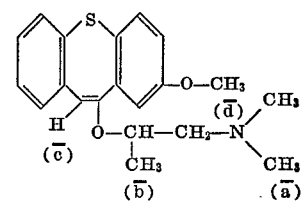

| | P.p.m. |
|---|---|
| (a): | |
| (Singlet) 6 H | 2.24 |
| (Singlet) 6 H | 2.30 |
| (b): | |
| (Doublet) 3 H | 1.12 |
| (Doublet) 3 H | 1.31 |
| (c): | |
| (Singlet) 1 H | 6.22 |
| (Singlet) 1 H | 6.35 |
| (d): | |
| (Singlet) | 3.69 |

(I) A solution of 2.4 g. of 8-methoxydibenzo[b,f]-oxepin-10(11H)-one in dimethylformamide (48 ml.) was treated with 1.8 g. of 1-methyl-2-dimethylaminoethyl chloride was treated as in (D) to yield 2.3 g. of d,1-8-methoxy - 10 - (1-methyl-2-dimethylaminoethyl)oxydibenzo[b,f]oxepin as yellow oil. Maleate, 140 to 142° C.

(J) A solution of 2.55 g. of 8-nitrodibenzo[b,f]-oxepin-10(11H)-one in dimethylformamide (50 ml.) was treated with 2.2 g. of 2-dimethylaminoethyl chloride as in (D) to yield 0.6 g. of 8-nitro-10-(2-dimethylaminoethyl)oxydibenzo[b,f]-oxepin as yellow oil. The oil was allowed to stand to give solid, which was recrystallized from n-hexane to provide 0.3 g. of 8-nitro-10-(2-dimethylaminoethyl)-oxydibenzo[b,f]oxepin as yellow crystals, M.P. 89–90° C.

(K) A solution of 3.6 g. of 8-chlorodibenzo[b,f]-oxepin in dimethylformamide (72 ml.) was treated with 4.5 g. of 1-(2-chloroethyl)-4-ethoxycarbonylpiperazine as in (D) to yield 1.5 g. of 8-chloro-10-[2-(4-ethoxycarbonyl-1-piperazinyl)-ethyl]oxydibenzo[b,f]oxepin as yellow oil. N.M.R.

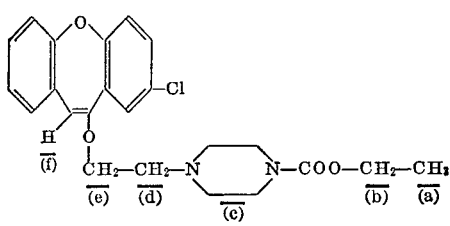

| | P.p.m. |
|---|---|
| (a): (Triplet) 3 H | 1.30 |
| (b): (Quartet) 2 H | 4.15 |
| (c): 8 H | {2.58, 3.55} |
| (d): (Triplet) 2 H | 2.90 |
| (e): (Triplet) 2 H | 4.08 |
| (f): (Singlet) 1 H | 6.00 |

(L) A solution of 1.36 g. of 8-methylthiodibenzo[b,f]-thiepin-10(11H)-one in dimethylformamide (20 ml.) was treated with 1.5 g. of 2-dimethylaminoethyl chloride as in (D) to yield 0.9 g. of 8-methylthio-10-(2-dimethylaminoethyl)oxydibenzo[b,f]thiepin as red oil. This was converted into the maleate, which was recrystallized from ethanol to provide colorless needles, M.P. 190–191° C.

(M) A solution of 2.4 g. of 8-methyldibenzo[b,f]-thiepin-10(11H)-one in dimethylformamide was treated with 2.5 g. of 2-dimethylaminoethyl chloride as in (D) to yield 8-methyl - 10 - (2-dimethylaminoethyl)oxydibenzo-[b,f]thiepin. Maleate, yellow needles, M.P. 211–213° C. (decomp).

Other compounds which can be prepared in the substantially same manner as above include:

10-[3-(4-methyl-1-piperazinyl)propyl]oxydibenzo[b,f] thiepin, colorless needles, M.P. 195–197° C.;
8-chloro-10-[2-(4-methyl-1-piperazinyl)ethyl]oxydibenzo[b,f]oxepin, M.P. 195–196° C. (decomp.) (maleate);
5-methyl-5H-10-(2-dimethylaminoethyl)oxydibenzo-[b,f]azepine, M.P. 150.5–152° C. (maleate);
8-dimethylsufamoyl-10-(2-dimethylaminoethyl)oxydibenzo[b,f]oxepin, M.P. 152–153° C. (maleate);
8-methoxy-10-(2-dimethylaminoethyl)oxydibenzo[b,f] thiepin;
8-ethyl-10-(2-dimethylaminoethyl)oxydibenzo[b,f] thiepin;
7-trifluoromethyl-10-(2-dimethylaminoethyl)oxydibenzo[b,f]thiepin;
8-trifluromethyl-10-(2-dimethylaminoethyl)oxydibenzo [b,f]thiepin;
8-nitro-10-(2-dimethylaminoethyl)oxydibenzo[b,f] thiepin;
8-dimethylsulfamoyl-10-(2-dimethylaminoethyl)oxydibenzo[b,f]thiepin;
8-amino-10-(2-dimethylaminoethyl)oxydibenzo[b,f] thiepin;
10-(2-dimethylaminoethyl)oxydibenzo[b,f]oxepin, M.P. 168–169° C. (maleate);
8-nitro-10-(2-dimethylaminoethyl)oxydibenzo[b,f] oxepin;
8-cyano-10-(2-dimethylaminoethyl)oxydibenzo[b,f] oxepin;
8-ethyl-10-(2-dimethylaminoethyl)oxydibenzo[b,f] oxepin, M.P. 172–173° C. (maleate);
8-chloro-10-(1-methyl-2-dimethylaminoethyl)oxydibenzo[b,f]thiepin;
8-chloro-10-(1-methyl-2-dimethylaminoethyl)oxydibenzo[b,f]oxepin;
8-nitro-10-(3-dimethylaminopropyl)oxydibenzo[b,f] thiepin;
8-chloro-10-(2-diethylaminopropyl)oxydibenzo[b,f] oxepin;
8-methoxy-10-[2-(4-methyl-1-piperazinyl)ethyl]oxydibenzo[b,f]thiepin;
8-ethyl-10-[2-(4-methyl-1-piperazinyl)ethyl]oxydibenzo[b,f]thiepin;
8-chloro-10-(2-piperidinoethyl)oxydibenzo[b,f]thiepin, M.P. 200.5–202° C. (decomp.) (maleate);
8-chloro-10-(2-morpholinoethyl)oxydibenzo[b,f]-thiepin;
8-chloro-10-[2-(4-ethyl-1-piperazinyl)ethyl]oxydibenzo [b,f]thiepin;
8-chloro-10-[2-(4-acetyl-1-piperazinyl)ethyl]oxydibenzo[b,f]thiepin;
8-chloro-10-[2-(4-formyl-1-piperazinyl)ethyl]oxydibenzo [b,f]thiepin, I.R. (liquid film)

| | Cm.$^{-1}$ |
|---|---|
| Tertiary amine | 2700 |
| N-CHO | 1665 |
| Enol ether | 1620 |
| Benzene | 830, 820 |

N.M.R. (CDCl$_3$)

| | P.p.m. |
|---|---|
| (Multiplet):piperazine nucleus, 8H | {2.74–2.44, 3.74–3.34} |
| (Triplet):—OCH$_2$—, J=6Hz | 4.15 |
| (Triplet):—CH$_2$N—, J=6Hz | 2.89 |
| (Singlet):vinyl proton | 6.36 |
| (Singlet):—CHO | 7.96 |

8-chloro-10-[2-(4-acetyloxyethyl-1-piperazinyl)ethyl]-oxydibenzo[b,f]thiepin, M.P. 174–176° C. (decomp.) (maleate);
8-methylthio-[2,-(4-methyl-1-piperazinyl)ethyl]oxydibenzo[b,f]oxepin;
8-chloro-10-(2-morpholinoethyl)oxydibenzo[b,f]oxepin;
5-methyl-5H-10-[2-(4-methyl-1-piperazinyl)ethyl]-dibenzo[b,f]azepine;
8-chloro-10-[2-(4-ethoxycarbonyl-1-piperazinyl)ethyl] oxydibenzo[b,f]thiepin;
8-methylthio-10-[2-(4-ethoxycarbonyl)-1-piperazinyl) ethyl]oxydibenzo[b,f]thiepin;
8-amino-10-[2-(4-ethoxycarbonyl-1-piperazinyl)ethyl] oxydibenzo[b,f]thiepin;
8-chloro-10-[2-(4-ethoxycarbonyl-1-piperazinyl)ethyl] oxydibenzo[b,f]oxepin;
8-methylthio-10-[2-(4-ethoxycarbonyl-1-piperazinyl) ethyl]oxepin;

5-methyl-5H-8-chloro-10-[2-(4-methoxycarbonyl-1-piperazinyl)ethyl]oxydibenzo[b,f]azepine;

5-methyl-5H-8-methylthio-10-[2-(4-ethoxycarbonyl-1-piperazinyl)ethyl]dibenzo[b,f]azepine;

8-chloro-10-[2-(4-methyl-1-piperazinyl)ethyl]oxydibenzo[b,f]thiepin, M.P. 178–180° C. (decomp.) maleate);

8-chloro-10-(2-diethylaminoethyl)oxydibenzo[b,f]oxepin, M.P. 115–116° C. (maleate);

8-chloro-10-[2-(4-ethoxycarbonylmethyl-1-piperazinyl)ethyl]oxydibenzo[b,f]thiepin (maleate), M.P. 165–166° C.;

8-chloro-10-[2-[4-(1-ethoxycarbonylethyl)-1-piperazinyl]ethyl]oxydibenzo[b,f]thiepin (maleate), M.P. 153–154° C., etc.

EXAMPLE 2

(A) Into a suspension of 0.97 g. of sodium hydride in a mixture of benzene and dimethylformamide while cooling with ice, a solution of 4.25 g. of 10,11-dihydro-10-oxodibenzo[b,f]thiepin in dimethylformamide was dropwise added under stirring, and the resultant mixture was stirred at 50° C. for about 1 hour. After the dropwise addition of a solution of 3.2 g. of trimethylenebromochloride in dimethylformamide, the resulting mixture was stirred at 50° C. for 48 hours. The reaction mixture was poured into water and extracted with benzene. The benzene extract was washed with water, dried over magnesium sulfate and concentrated to give red oil (5.7 g.). The oil was subjected to silica gel chromatography and eluted with benzene. The eluate was concentrated and recrystallized from ethanol to give 10-(3-chloropropyl)-oxydibenzo[b,f]thiepin (3.1 g.) as yellow granules, M.P. 125–126° C.

A mixture of 270 mg. of 10-(3-chloropropyl)oxydibenzo[b,f]thiepin and 3.0 g. of 1-methylpiperazine was stirred at 120–125° C. for 19 hours. The reaction mixture was poured into water and the solution was extracted with ether. The ether layer, after washed with water, was extracted with 10% hydrochloric acid. The aqueous layer was washed with ether, made alkaline with 10% sodium hydroxide solution and then extracted with ether. The ether layer was washed with water and the ether was distilled off to yield 0.3 g. of oil. This was converted with maleic acid into 0.32 g. of 10-[3-(4-methyl-1-piperazinyl)propyl]oxydibenzo[b,f]thiepin maleate as colorless powder, which was recrystallized from aqueous ethanol to give colorless needles, M.P. 195–197° C.

(B) A mixture of 0.3 g. of 10-(3-chloropropyl)oxydibenzo[b,f]thiepin and 3.0 g. of 1-(2-hydroxyethyl)piperazine was stirred at 130° C. for 17 hours. The reaction mixture was treated as in (A) to give 0.15 g. of 10-[3-[4-(2-hydroxyethyl)-1 - piperazinyl]propyl]oxydibenzo[b,f]thiepin. Maleate, colorless needles, M.P. 169–170° C.

Other compounds which can be prepared in the substantially same manner as above include:

8-chloro-10-[2-(4-methyl-1-piperazinyl)ethyl]oxydibenzo[b,f] thiepin, M.P. 178–180° C. (maleate);

8-chloro-10-[2-(4-methyl-1-piperazinyl)ethyl]oxydibenzo[b,f]oxepin, M.P. 195–196° C. (maleate);

10-(2-diethylaminoethyl)oxydibenzo[b,f]thiepin, M.P. 129–130° C. (maleate);

10-(3-dimethylaminopropyl)-oxydibenzo[b,f]thiepin, M.P. 140–141° C. (decomp.) (maleate);

8-chloro-10-(2-dimethylaminoethyl)oxydibenzo[b,f]thiepin, crystals, M.P. 90–91° C.;

8-chloro-10-(2-dimethylaminoethyl)oxydibenzo[b,f]oxepin, M.P. 161–163.5° C. (decomp.) (maleate);

8-chloro-10-(3-dimethylaminopropyl)oxydibenzo[b,f]oxepin, M.P. 153–153.5° C. (decomp.) (maleate);

8-methoxy-10-(2-dimethylaminoethyl)oxydibenzo[b,f]oxepin, M.P. 166–167.5° C. (maleate);

8-chloro-10-[2-(4-ethoxycarbonyl-1-piperazinyl)ethyl]oxydibenzo[b,f]thiepin, yellow oil;

d,1-8-methoxy-10-(1-methyl-2-dimethylaminoethyl)oxydibenzo[b,f]thiepin, yellow oil, M.P. 168–169° C. (maleate);

d,1-8-methoxy-10-(1-methyl-2-dimethylaminoethyl)oxydibenzo[b,f]oxepin, yellow oil;

8-nitro-10-(2-dimethylaminoethyl)oxydibenzo[b,f]oxepin, crystals, M.P. 89–90° C.;

8-chloro-10-[2-(4-ethoxycarbonyl-1-piperazinyl)ethyl]oxydibenzo[b,f]oxepin, yellow oil;

8-methylthio-10-(2-dimethylaminoethyl)oxydibenzo[b,f]thiepin, M.P. 190–191° C. (maleate);

5-methyl-5H-10-(2-dimethylaminoethyl)oxydibenzo[b,f]azepine, M.P. 150.5–152° C. (maleate);

8-dimethylsulfamoyl-19-(2-dimethylaminoethyl)oxydibenzo[b,f]oxepin, M.P. 152–153° C. (maleate);

8-methyl-10-(2-dimethylaminoethyl)oxydibenzo[b,f]thiepin, M.P. 211–213° C. (decomp.) (maleate);

8-methoxy-10-(2-dimethylaminoethly)oxydibenzo[b,f]thiepin;

8-ethyl-10-(2-dimethylaminoethyl)oxydibenzo[b,f]thiepin;

7-trifluoromethyl-10-(2-dimethylaminoethyl)oxydibenzo[b,f]thiepin;

8-trifluoromethyl-10-(2-dimethylaminoethyl)oxydibenzo[b,f]thiepin;

8-nitro-10-(2-dimethylaminoethyl)oxydibenzo[b,f]thiepin;

8-dimethylsulfamoyl-10-(2-dimethylaminoethyl)oxydibenzo[b,f]thiepin;

8-amino-10-(2-dimethylaminoethyl)oxydibenzo[b,f]thiepin;

10-(2-dimethylaminoethyl)oxydibenzo[b,f]oxepin, M.P. 168–169° C. (maleate);

8-amino-10-(2-dimethylaminoethyl)oxydibenzo[b,f]oxepin;

8-cyano-10-(2-dimethylaminoethyl)oxydibenzo[b,f]oxepin;

8-ethyl-10-(2-dimethylaminoethyl)oxydibenzo[b,f]oxepin, M.P. 172–173° C. (maleate);

8-chloro-10-(1-methyl-2-dimethylaminoethyl)oxydibenzo[b,f]thiepin;

8-chloro-10-(1-methyl-2-dimethylaminoethyl)oxydibenzo[b,f]oxepin;

8-nitro-10-(3-dimethylaminopropyl)oxydibenzo[b,f]thiepin;

8-chloro-10-(2-diethylaminopropyl)oxydibenzo[b,f]oxepin;

8-methoxy-10-[2-(4-methyl-1-piperazinyl)ethyl]oxydibenzo[b,f]thiepin;

8-ethyl-10-[2-(4-methy-1-piperazinyl)ethyl]oxydibenzo[b,f]thiepin;

8-chloro-10-(2-piperidinoethyl)oxydibenzo[b,f]thiepin, M.P. 200.5–202° C. (decomp.) (maleate);

8-chloro-10-(2-morpholinoethyl)oxydibenzo[b,f]thiepin;

8-chloro-10-[2-(4-ethyl-1-piperazinylethyl]oxydibenzo[b,f]thiepin;

8-chloro-10-[2-(4-acetyl-1-piperazinylethyl]oxydibenzo[b,f]thiepin;

8-chloro-10-[2-(4-formyl-1-piperazinyl)ethyl]oxydibenzo[b,f]thiepin,

I.R. (liquid film)

| | Cm.$^{-1}$ |
|---|---|
| Tertiary amine | 2700 |
| N—CHO | 1665 |
| Enol ether | 1620 |
| Benzene | 830, 820 |

N.M.R. (CDCl$_3$)

| | P.p.m. |
|---|---|
| (Multiplet): piperazine nucleus, 8H | 2.74–2.44 / 3.74–3.34 |
| (Triplet):—OCH$_2$—, J=6Hz | 4.15 |
| (Triplet): —CH$_2$N—, J=6Hz | 2.89 |
| (Singlet): vinyl proton | 6.36 |
| (Singlet): —CHO | 7.96 |

8-chloro-10-[2-(4-acetyloxyethyl-1-piperazinyl)ethyl]
  oxydibenzo[b,f]thiepin, M.P. 174–176° C. (decomp.)
  (maleate);
8-methylthio-[2-(4-methyl-1-piperazinyl)ethyl]oxydi-
  benzo[b,f]oxepin;
8-chloro-10-(2-morpholinoethyl)oxydibenzo[b,f]
  oxepin;
5-methyl-5H-10-[2-(4-methyl)-1-piperazinyl)ethyl]
  dibenzo[b,f]azepine;
8-chloro-10-[2-[4-(2-hydroxyethyl)-1-piperazinyl]ethyl]
  oxydibenzo[b,f]thiepin, M.P. 147–147.5° C. (decomp.)
  (maleate);
5-methyl-5H-10-[3-[4-(2-hydroxyethyl)-1-piperazinyl]
  propyl]oxydibenzo[b,f]azepine;
8-chloro-10-[2-(4-ethoxycarbonyl)-1-piperazinylethyl]
  oxydibenzo[b,f]thiepin;
8-methylthio-10-[2-(4-ethoxycarbonyl)-1-piperazinyl-
  ethyl]oxydibenzo[b,f]thiepin;
8-amino-10-[2-(4-ethoxycarbonyl)-1-piperazinylethyl]
  oxydibenzo[b,f]thiepin;
8-chloro-10-[2-(4-ethoxycarbonyl)-1-piperazinyl)ethyl]
  oxepin;
8-methylthio-10-[2-(4-ethoxycarbonyl)-1-piperazinyl)
  ethyl]oxepin;
5-methyl-5H-8-chloro-10-[2-(4-methoxycarbonyl-1-
  piperazinyl)ethyl]oxydibenzo[b,f]azepine;
5-methyl-5H-8-methylthio-10-[2-(4-ethoxycarbonyl-1-
  piperazinyl)ethyl]dibenzo[b,f]azepine;
8-chloro-10-[2-(1-piperazinyl)ethyl]oxydibenzo[b,f]
  thiepin, M.P. 153–156° C. (decomp.) (maleate);
8-chloro-10-[2-[4-(2-hydroxypropyl)-1-piperazinyl]
  ethyl[oxydibenzo[b,f]thiepin, M.P. 189–190° C.
  (decomp.) (maleate).
8-chloro-10-[2-[4-(1-methyl-2-hydroxyethyl)-1-pipera-
  zinyl]ethyl]oxydibenzo[b,f]thiepin, M.P. 150–151° C.
  (decomp.) (maleate);
8-chloro-10-(2-diethylaminoethyl)oxydibenzo[b,f]
  oxepin, M.P. 115–116° C. (maleate);
8-chloro-10-[2-(4-ethoxycarbonylmethyl-1-piperazinyl)
  ethyl]oxydibenzo[b,f]thiepin (maleate), M.P.
  165–166° C.;
8-chloro-10-[2-[4-(1-ethoxycarbonylethyl)-1-pipera-
  zinyl]ethyl]oxydibenzo[b,f]thiepin (maleate), M.P.
  153–154° C., etc.

EXAMPLE 3

(A) A solution of 0.9 g. of 8-chloro-10-[2-(4-ethoxy-
carbonyl - 1 - piperazinyl)ethyl]oxydibenzo[b,f]thiepin in
tetrahydrofuran (40 ml.) was dropwise added to a solu-
tion of 0.5 g. of lithium aluminum hydride in tetrahydro-
furan (5 ml.), and the mixture was refluxed for 17 hours.
To the reaction mixture, after cooled, there were added
ether (50 ml.), ethyl acetate (2 ml.), 30 minutes there-
after ether (50 ml.) and then water (5 ml.) in turn. The
ether layer, after washed with water, was extracted with
10% hydrochloric acid. The aqueous layer, after made
neutral with 10% sodium hydroxide solution, was ex-
tracted with ether. The extract was dried over magnesium
sulfate and concentrated. The residue was dissolved in a
small amount of ethyl acetate, and the solution was passed
through a column filled with aluminum and ethyl acetate.
The first eluate was concentrated to yield 0.4 g. of 8-
chloro - 10 - [2-(4-methyl-1-piperazinyl)ethyl]oxydiben-
zo[b,f]thiepin as yellow oil. This was converted into the
corresponding maleate, M.P. 178–180° C.

(B) As in (A), 1.2 g. of 8-chloro-10-[2-(4-ethoxy-car-
bonyl - 1 - piperazinyl)ethyl]oxydibenzo[b,f]oxepin were
treated to yield 8-chloro-10-[2-(4-methyl-1-piperazinyl)-
ethyl]oxydibenzo[b,f]oxepin as yellow oil.

I.R. (liquid film)
Enol ether, 1630 cm.⁻¹
N.M.R. (CCl₄, tetramethylsilan)

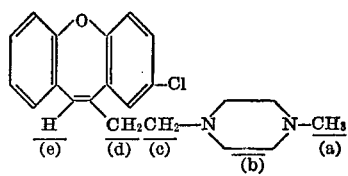

| | P.p.m. |
|---|---|
| (a): (Singlet) | 2.15 |
| (b): | 2.35 |
| (c): (Triplet) | 2.78 |
| (d): (Triplet) | 4.05 |
| (e): (Singlet) | 5.88 |

Other compounds which can be prepared in the substan-
tially same manner as above include:

10-[3-(4-methyl-1-piperazinyl)propyl]oxydibenzo[b,f]
  thiepin, M.P. 195–197° C. (maleate);
8-methoxy-10-[2-(4-methyl-1-piperazinyl)ethyl]-oxydi-
  benzo[b,f]thiepin;
8-ethyl-10-[2-(4-methyl-1-piperazinyl)ethyl]oxydibenzo
  [b,f]thiepin;
8-methylthio-10-[2-(4-methyl-1-piperazinyl)ethyl]oxy-
  dibenzo[b,f]oxepin;
5-methyl-5H-10-[2-(4-methyl-1-piperazinyl)ethyl]oxydi-
  benzo[b,f]azepine;
8-nitro-10-[3-(4-methyl-1-homopiperazinyl)-propyl]thie-
  pin;
8-chloro-10-[3-(4-methyl-1-homopiperazinyl)-propyl]
  oxepin, etc.

EXAMPLE 4

A slution of 3.0 g. of sodium hydroxide in water (3
ml.) was added to 3.3 g. of 8-chloro-10-[2-(4-formyl-1-
piperazinyl)ethyl]oxydibenzo[b,f]thiepin dissolved in a
mixture of 99% ethanol (50 ml.) and water (10 ml.),
and the mixture was refluxed for 3 hours. Half volume
of ethanol in the reaction mixture was removed by evapo-
ration. To the residue, there was added water, and the
aqueous solution was subjected to extraction with ethyl
acetate repeatedly. The ethyl acetate layer was dried and
then evaporated to remove ethyl acetate to provide 1.5 g.
of 8-chloro - 10 - [2-(1-piperazinyl)-ethyl]oxydibenzo
[b,f] thiepin as yellow oil, which was converted into the
corresponding maleate. This was recrystallized from etha-
nol-ether to produce 8-chloro-10-[2-(1-piperazinyl)ethyl]-
oxydibenzo[b,f]thiepin maleate, M.P. 153–156° C. (de-
comp.).

EXAMPLE 5

To a solution of 0.1 g. of 8-chloro-10-[2-(1-piperazin-
yl)ethyl]oxydibenzo[b,f]thiepin in methanol (15 ml.),
there was added excess volume of propylene oxide, and the
mixture was refluxed on a water bath for 1 hour. The
methanol was removed by evaporation, and to the residue
there was added water. The solution was subjected to ex-
traction with ethyl acetate. The ethyl acetate layer was
dried and then concentrated to provide oil. This was con-
verted into the corresponding maleate by a conventional
method, which was recrystallized from methanol to pro-
duce 0.1 g. of pale yellow crystals, M.P. 162–164° C. (de-
comp.) which was 8-chloro-10-[2-[4-(2 - hydroxypropyl)-
1-piperazinyl]ethyl] - oxydibenzo[b,f]thiepin maleate con-
taminated with 8-chloro-10-[2-[4-(1-methyl - 2 - hydroxy-
ethyl)-1-piperazinyl]ethyl]-oxydibenzo[b,f] thiepin male-
ate.

I.R. (Nujol)

| | Cm.⁻¹ |
|---|---|
| Hydroxy | 3350 |
| Carboxyl | 1700 |
| Enol ether | 1630 |
| Benzene nucleus | 867 |

Thus obtained product was separated into each com-
ponent 8-chloro - 10 - [2-[4-(2-hydroxypropyl)-1-piper-
azinyl]ethyl]-oxydibenzo[b,f]thiepin maleate, M.P. 189–

190° C. (decomp.) as main product and 8-chloro-10-[2-[4-(1-methyl - 2 - hydroxyethyl)-1-piperazinyl]ethyl]oxydibenzo[b,f]thiepin maleate, M.P. 151–152° C. (decomp.).

(A) To a solution of 0.15 g. of 8-chloro-10-[2-(1-piperazinyl)ethyl]oxydibenzo[b,f]thiepin in dimethyl acetoamide (15 ml.), there were added 0.3 g. of ethyl bromoacetate and 5 ml. of triethylamine. The mixture was stirred at 90–95° C. for 1 hour. The reaction mixture was poured into an excess volume of water and the solution was subjected to extraction with ethyl acetate repeatedly. The ethyl acetate layer was dried and the ethyl acetate was removed by evaporation to provide 8-chloro-10 - [2 - (4 - ethoxycarbonylmethyl-1-piperazinyl)ethyl]oxydibenzo[b,f]thiepin as oil, which was converted into the corresponding maleate by a conventional method. This was recrystallized from ethanol to produce 8-chloro-10-[2-(4 - ethoxycarbonylmethyl - 1 - piperazinylethyl]oxydibenzo[b,f]thiepin maleate, M.P. 165–166° C. 0.1 g. of 8-chloro-10-[2-(4-ethoxycarbonylmethyl-1-piperazinyl)ethyl]oxydibenzo[b,f]thiepin dissolved in dry ether (20 ml.) was added dropwise under room temperature to a suspension of 200 mg. of lithium aluminum hydride in ether (20 ml.). The mixture was stirred for 1 hour and then refluxed for 1 hour. Thereafter, an excess volume of lithium aluminum hydride in the reaction mixture was decomposed by adding a small amount of ethyl acetate and then 5 ml. of water. The ether layer was collected by separation and dried. The ether was removed by evaporation to produce 8-chloro-10-[2-[4-(2-hydroxyethyl)-1-piperazinyl]ethyl]oxydibenzo[b,f]thiepin as oil, which was converted into the corresponding maleate as crystals, M.P. 147–147.5° C. (decomp.).

(B) To a solution of 0.25 g. of 8-chloro-10-[2-(1-piperazinyl)ethyl]oxydibenzo[b,f]thiepin in dimethyl-acetoamide (20 ml.), there was added 0.5 g. of ethyl α-bromopropionate, and the mixture was stirred at 90–95° C. for 1 hour. The reaction mixture was poured into an excess volume of water and the solution was subjected to extraction with ethyl acetate. The ethyl acetate layer was washed with water, dried and treated with active carbon, and then the ethyl acetate was removed by evaporation to provide 0.2 g. 8-chloro-10-[2-[4-(1-ethoxycarbonylethyl) - 1 - piperazinyl]ethyl]oxydibenzo[b,f]thiepin as oil, which was converted into the corresponding maleate. This was recrystallized from ethanol to produce 8-chloro - 10 - [2 - [4 - (1-ethoxycarbonylethyl)-1-piperazinyl]ethyl]oxydibenzo[b,f]thiepin maleate, M.P. 153–154° C. 0.2 g. of 8-chloro-10-[2-[4-(1-ethoxycarbonylethyl) - 1 - piperazinyl]ethyl]oxydibenzo[b,f]thiepin dissolved in a mixture of ether (20 ml.) and tetrahydrofuran (20 ml.) was added dropwise under room temperature to a suspension of lithium aluminum hydride (0.2 g.) in ether (25 ml.), and the mixture was treated in the same manner as described in (A) to produce 0.1 g. of 8-chloro-10-[2-[4-(1 - methyl-2-hydroxyethyl)-1-piperazinyl]ethyl]oxydibenzo[b,f]thiepin maleate, M.P. 150–151° C. (decomp.). Other compounds which can be prepared in the substantially same manner as above include: 10-[3-[4-(2-hydroxyethyl) - 1 - piperazinyl]propyl]oxydibenzo[b,f]thiepin maleate, colorless needles, M.P. 169–170° C.; 5-methyl-5H-10-[3-[4 - (2 - hydroxyethyl)-1-piperazinyl]propyl]oxydibenzo[b,f]azepine, etc.

EXAMPLE 7

A solution of 0.5 g. of acetyl chloride in ether (10 ml.) was added dropwise to 0.3 g. of 8-chloro-10-[2-[4-(2-hydroxyethyl) - 1 - piperazinyl]ethyl]oxydibenzo[b,f]thiepin dissolved in a mixture of tetrahydrofuran (30 ml.) and triethylamine (5 ml.). This, after allowed to stand for 2 hours under room temperature, was reacted at 40° C. for 2 hours. The reaction mixture, after removing mineral substance by filtration, was concentrated under reduced pressure. To the residue, there was added water and the solution was subjected to extraction with a mixture of benzene and ether. The extract was washed with water, dried and then the solvents were evaporated to provide 0.2 g. of 8-chloro-10-[2-[4-(2-acetyloxyethyl)-1-piperazinyl]ethyl]oxydibenzo[b,f]thiepin as oil, which was converted into the corresponding maleate by a conventional method. This was recrystallized from 99% ethanol to produce 8-chloro-10-[2-[4-(2-acetyloxyethyl)-1-piperazinyl]ethyl]oxydibenzo[b,f]thiepin maleate, M.P. 174–176° C. (decomp.).

EXAMPLE A

A suitable formulation of tablets consists of:

| | Grams |
|---|---|
| (1) 8-chloro-10-(2 - dimethylaminoethyl)oxydibenzo[b,f]thiepin | 10 |
| (2) Lactose | 66 |
| (3) Starch | 5 |
| (4) Magnesium stearate | 2 |

The active ingredient, lactose and starch are thoroughly mixed and granulated. For tableting, the magnesium stearate is added, mixed with the granules, and the mixture tableted on a rotary press. Use of this procedure produces 100 tablets each containing 50 mg. of the active ingredient.

EXAMPLE B

Another suitable formulation of tablets consists of:

| | Grams |
|---|---|
| (1) 8-chloro-10-(2-dimethylaminoethyl)oxydibenzo[b,f]thiepin | 10 |
| (2) Mannitol | 82 |
| (3) Starch | 6 |
| (4) Magnesium stearate | 2 |

The active ingredient, mannitol and starch are thoroughly mixed and granulated. For tableting, the magnesium stearate is added, mixed with granules, and the mixture tableted on a rotary press. Use of this procedure produces 100 tablets each containing 100 mg. of the active ingredient.

EXAMPLE C

A suitable formulation of dragées consists of:

| | | |
|---|---|---|
| (1) 8-chloro-10-(2-dimethylaminoethyl)oxydibenzo[b,f]thiepin | grams | 18,000 |
| (2) Aerosil | do | 4,500 |
| (3) Maize starch | do | 4,500 |
| (4) Stearic acid | do | 700 |
| (5) Ethanol | liters | 6.0 |
| (6) Gelatin | grams | 1,800 |
| (7) Purified water | liters | 20.0 |
| (8) Talc | grams | 600 |
| (9) Magnesium stearate | do | 375 |

From the above materials, there are prepared 600,000 cores each containing 30 mg. of the active ingredient in a conventional manner.

What is claimed is:

1. A tricyclic enol ether compound of the formula:

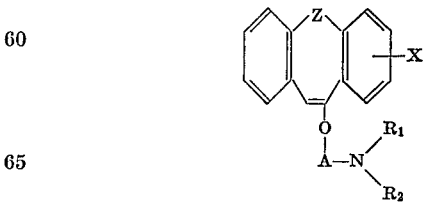

wherein X is hydrogen, halogen, lower alkyl, lower alkoxy, lower alkylthio, di(lower)alkylsulfamoyl, nitro, cyano, amino or trifluoromethyl, Z is oxy, thio or lower alkylimino, A is lower alkylene, and $R_1$ and $R_2$ are each lower alkyl or $R_1$ and $R_2$ taken together with N is a heterocyclic radical selected from the group consisting of pyrrolidino, piperazino, homopiperazino, piperidino and morpholino.

2. The tricyclic enol ether compound according to claim 1, wherein X is halogen, Z is thio, A is lower alkylene, and $R_1$ and $R_2$ are each lower alkyl, i.e. halo-10 - (di(lower) - alkylamino(lower)alkyl)oxydibenzo[b,f]thiepin.

3. The tricyclic enol ether compound according to claim 2, wherein X is chlorine at the 8-position, Z is thio, A is ethylene, and $R_1$ and $R_2$ are each methyl, i.e. 8 - chloro - 10 - (2-dimethylaminoethyl)oxydibenzo[b,f]thiepin.

4. The tricyclic enol ether compound according to claim 1, wherein X is halogen, Z is oxy, A is lower alkylene, and $R_1$ and $R_2$ are each lower alkyl, i.e. halo-10-(di(lower)alkylamino(lower)alkyl)oxydibenzo[b,f]oxepin.

5. The tricyclic enol ether compound according to claim 4, wherein X is chlorine at the 8-position, Z is oxy, A is ethylene, and $R_1$ and $R_2$ are each methyl, i.e. 8-chloro-10-(2-dimethylaminoethyl)oxydibenzo[b,f]oxepin.

6. The tricyclic enol ether compound according to claim 1, wherein X is methoxy at the 8-position, Z is thio, A is ethylene, and $R_1$ and $R_2$ are each methyl, i.e. 8 - methoxy - 10 - (2 - dimethylaminoethyl)-oxydibenzo[b,f]thiepin.

References Cited

UNITED STATES PATENTS

| | | | |
|---|---|---|---|
| 3,100,207 | 8/1963 | Zirkle | 260—268 |
| 3,356,680 | 12/1967 | Schindler et al. | 260—268 |

FOREIGN PATENTS

| | | | |
|---|---|---|---|
| 111,416 | 7/1964 | Czechoslovakia | 260—327 |
| 113,624 | 2/1965 | Czechoslovakia | 260—327 |
| 123,691 | 7/1967 | Czechoslovakia | 260—327 |
| 414,643 | 12/1966 | Switzerland | 260—239 |
| 1,442,278 | 5/1966 | France | 260—327 |

OTHER REFERENCES

Malinovskii: Epoxides and Their Derivatives (Israel Program for Scientific Translations, Jerusalem, 1965), p. 205.

Morrison et al.; Org. Chem. (Allyn & Bacon, Boston, 1959), pp. 481, 540, 541.

Turner: Screening Methods in Pharmacology, (Academic Press, N.Y. 1965), pp. 127–134 and 235–7.

Turner: Screening Methods in Pharmacology (Academic Press, N.Y., 1965), pp. 87–92.

HENRY R. JILES, Primary Examiner

C. M. JAISLE, Assistant Examiner

U.S. Cl. X.R

260—239 D, 247.1, 247.5 R, 247.7 F, 268 TR, 293.57, 293.58, 293.59, 326.5 C, 326.5 SA; 424—248, 250, 267, 274, 275, 278